United States Patent [19]

Mattern

[11] Patent Number: 5,636,666

[45] Date of Patent: *Jun. 10, 1997

[54] SYSTEM FOR REMOVAL OF UNKNOWN, CORROSSIVE, OR POTENTIALLY HAZARDOUS GASES FROM A GAS CONTAINER

[75] Inventor: Charles C. Mattern, Wintergarden, Fla.

[73] Assignee: Earth Resources Corporation, Ocoee, Fla.

[*] Notice: The portion of the term of this patent subsequent to Jan. 24, 2012, has been disclaimed.

[21] Appl. No.: 267,300

[22] Filed: Jun. 29, 1994

Related U.S. Application Data

[63] Continuation of Ser. No. 877,736, May 4, 1992, Pat. No. 5,383,499.

[51] Int. Cl.⁶ .................. B67B 7/00; F04F 5/00
[52] U.S. Cl. .................. 141/51; 141/65; 417/55; 417/151; 417/158
[58] Field of Search .................. 141/7, 8, 51, 65–67, 141/83, 98, 329, 330; 417/54, 55, 79, 80, 87, 89, 151, 152, 154, 158, 176, 198; 588/259

[56] References Cited

U.S. PATENT DOCUMENTS

| | | | |
|---|---|---|---|
| Re. 33,799 | 1/1992 | Gold et al. | 141/51 |
| 2,338,583 | 1/1944 | Hickman et al. | 417/54 |
| 2,379,436 | 7/1945 | Hickman et al. | 417/54 |
| 2,488,157 | 11/1949 | Bassano | 417/158 |
| 3,481,529 | 12/1969 | Mugele | 417/54 |
| 4,132,504 | 1/1979 | Fitch | 417/68 |
| 4,198,190 | 4/1980 | Groenhof | 417/55 |
| 4,386,637 | 6/1983 | Buchanan et al. | 141/65 |
| 4,634,560 | 1/1987 | Eckert | 261/76 |
| 4,679,987 | 7/1987 | Olsen | 417/54 |
| 4,690,180 | 9/1987 | Gold | 141/51 |
| 4,718,240 | 1/1988 | Andeen et al. | 62/55.5 |
| 4,718,834 | 1/1988 | Ebner et al. | 417/54 |
| 4,762,467 | 8/1988 | Ackermann et al. | 417/54 |
| 4,792,284 | 12/1988 | Straub et al. | 417/151 |
| 4,795,315 | 1/1989 | Schultze | 417/68 |
| 4,944,333 | 7/1990 | Gold et al. | 141/51 |
| 5,035,269 | 7/1991 | Pytryga et al. | 141/1 |
| 5,055,003 | 10/1991 | Svensson | 417/191 |
| 5,186,219 | 2/1993 | Gold et al. | 141/51 |
| 5,197,863 | 3/1993 | Dardis et al. | 417/68 |
| 5,295,792 | 3/1994 | Shackford | 417/55 |

FOREIGN PATENT DOCUMENTS

PCT/US/93/04099 5/1993 WIPO.

OTHER PUBLICATIONS

"The Clear Choice for Safe, Versatile Dependable Performance", KRYTOX® Fluorinated Greases, DuPont Company, Wilmington, Delaware.

"One Grease Fits All", KRYTOX® Fluorinated Grease, DuPont Company, Wilmington, Delaware.

"Vacuum Pump Fluids: The Lifeblood of Vacuum Systems", DuPont Company, Wilmington, Delaware.

"Severe Service Lubricants for Industrial, Automotive, Aerospace and Electronic Applications: Fluorinated Greases, Fluorinated Oils, Vacuum Pump Fluids", DuPont Company, Wilmington, Delaware.

"KRYTOX Vacuum Pump Fluids: The Clear Choice for Superior Performance in Vacuum Systems", KRYTOX® Fluorinated Lubricants, DuPont Company, Wilmington, Delaware.

(List continued on next page.)

*Primary Examiner*—J. Casimer Jacyna
*Attorney, Agent, or Firm*—Baker & Botts, L.L.P.

[57] ABSTRACT

A system for removing a gas from a pressurized gas container. A sealable, impermeable rupture vessel encloses an interior on all sides and has a sealable door for allowing access to the interior for placement therein of the gas container. A puncture device is contained within the rupture vessel for puncturing the gas container and releasing the potentially hazardous and unknown gas from the gas container into the rupture vessel. A pump draws the gas from within the rupture vessel without permitting the gas to communicate with any moving parts in the pump.

7 Claims, 5 Drawing Sheets

OTHER PUBLICATIONS

Department of the Army, Office of the AMC Program Manager for Demilitarization of Chemical Material, "Supplement C to Project Eagle–Phase II Demilitarization and Disposal of the M34 Cluster at Rocky Mountain Arsenal Final Plan" (Feb. 1973), pp. viii–ix, 15–21, IC–1, 2C–15.

Solkatronic Chemicals Inc., *Instruction Manual for Model 5502 Emergency Response Contaiment Vessel*, Oct. 1990.

Memo, New Jersey State Department of Environmental Protection, Feb. 4, 1982, two pages.

"No Known Treatment For Accident Victims," *Sunday Times*, Trenton, New Jersey, Feb. 28, 1982, p. 87.

"This Stuff Is Getting To All Of US!," *Fire Engineering*, Apr. 1983, pp. 21, 25–28.

"Poison Spills Impact Remains," *Richmond Times–Dispatch*, Mar. 16, 1983, pp. A1–A2.

"Something Out Of A Space Movie," *Richmond Times–Dispatch*, Feb. 1982, pp. A1–A2.

"Pentaborane Release, Environmental Laboratories, Hanover County, VA," National Response Team Briefing, Mar. 1982, pp. 1–2.

Memo, CECOS International, Inc. to Environmental Emergency Branch, Mar. 17, 1982, pp. 1–5.

# SYSTEM FOR REMOVAL OF UNKNOWN, CORROSSIVE, OR POTENTIALLY HAZARDOUS GASES FROM A GAS CONTAINER

This application is a continuation of application Ser. No. 07/877,736, filed May 4, 1992, now U.S. Pat. No. 5,383,499.

BACKGROUND OF THE INVENTION

1. Field of the Invention

The present invention relates to a pump, system and method for collecting and containing gaseous substances. More specifically, the present invention is directed to the collection and containment of unknown and potentially hazardous gases by a system including a pump which generates a suction using the flow of an essentially chemically inert fluid.

2. Description of the Prior Art

The present invention is particularly suited for application in the field of hazardous waste management, and more specifically to the recontainerization, disposal, and/or scrubbing of the contents of deteriorated compressed gas cylinders. U.S. Pat. No. 4,944,333 (hereinafter the "'333 patent") and U.S. Pat. No. 4,690,180 (hereinafter the "'180 patent") disclose a system for the safe rupturing of deteriorated compressed gas cylinders. Both the '180 and '333 patents are hereby incorporated by reference into this specification.

The unique environment for which the system of the present invention is particularly suited demands that the pump which drives the system function reliably regardless of the type of gas which is processed. Waste gas cylinders often bear no recognizable markings which identify the gas or gases contained in the cylinders. The gas may be entirely harmless such as air or nitrogen. On the other hand, the gas may be highly flammable, reactive, corrosive, toxic, or poisonous. A system to process unknown gases must be able to safely handle the wide variety of gases to which it may be exposed.

A difficulty with the prior art resides in the inability of vacuum pumps, which have been conventionally used in such systems, to resist degradation when exposed to corrosive gases. As a general rule, the most economically feasible and effective conventional vacuum pump used in the past has been the rotary vane vacuum pump.

Within the housing of the conventional rotary vane vacuum pump, the gas inlet port and gas outlet port are physically near one another. The rotary vane within the housing draws the gas through the gas inlet port, compresses it by reducing its physical volume, and exhausts the gas, now pressurized, through a gas outlet port. To maintain an adequate seal between the rotary vane and the housing, the conventional pump depends upon the maintenance of a film of oil between the rotary vane and the housing. If the oil film breaks down, the conventional pump can not draw a vacuum.

The oil film in the conventional pump is particularly sensitive to certain environmental conditions. Certain gases may interfere with the wetting action of the film. Other gases, such as corrosive gases, may react with the rotary vane and housing to pit and scar the metal surfaces. Once the moving elements of such a pump are scarred, the oil cannot form an adequate seal between the rotary vane and the housing. It is also possible that potentially flammable gases may ignite within the housing of the conventional pump and cause scarring of the moving parts. The oil seal of the conventional pump may be compromised by any of these conditions, each of which can prevent the pump from drawing a vacuum. When such a pump is then required to extract a poisonous or toxic gas from a compressed gas cylinder, the probability that the gas may leak and cause serious injury is increased.

Due to the sensitivity of conventional pumps to various gaseous environments, these pumps have been found to break down after only a few hours of operation, especially when the conventional pump is subjected to corrosive gases. When the pump becomes inoperable, the entire system becomes disabled. This problem not only makes it more expensive to collect and contain hazardous gases but presents various safety hazards.

SUMMARY OF THE INVENTION

A principle object of the present invention is to provide an apparatus, system, and method by which a gas may be evacuated from one container and transferred to another without exposing the moving parts of the pump to the gas, thereby both avoiding degradation and destruction of the pump parts and minimizing the possibility of leakage of the gas from the pump.

It is another object of the present invention to provide an apparatus, system and method which can provide a safe extraction of unknown and potentially hazardous gas from a container and supply sufficient output pressure to force the gas into a pressurized storage container.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a sealable, impermeable rupture vessel having an interior enclosed on all sides and a sealable door for allowing access to the interior for placement therein of the gas container, puncture device within the rupture vessel for puncturing the gas container and releasing the gas from the gas container into the rupture vessel, and a pump capable of drawing gas from within the rupture vessel without permitting the gas to communicate with any moving parts in the pump.

To further achieve the objects, and in accordance with the objects of the present invention, as embodied and claimed herein, the invention also comprises a pump for pumping a gas having at least one pressure vessel containing a fluid, at least one venturi eductor disposed within the pressure vessel and at least partially immersed in the fluid with the pressure vessel, at least one gas inlet port extending through the pressure vessel and in fluid communication with the venturi eductor, at least one fluid inlet port extending through the pressure vessel and in fluid communication with the venturi eductor, at least one venturi outlet port for accepting the flow of a mixture of gas and fluid, the venturi outlet port being in fluid communication with the venturi eductor and positioned above the fluid within the pressure vessel, at least one gas outlet port extending through the pressure vessel and positioned above the fluid within the pressure vessel, at least one fluid outlet port extending through the pressure vessel, and means for separating gas from the mixture of gas and fluid flowing from the venturi outlet port and essentially preventing the exhaust of fluid through the gas outlet, whereby the flow of the fluid into the fluid inlet port and out of the fluid outlet port creates a vacuum which draws the gas through the gas inlet port, through the venturi outlet port and separating means, and out the gas outlet port without the interaction of the gas with any moving parts within the pump.

To further achieve the objects, and in accordance with the objects of the present invention, as embodied and broadly claimed herein, the invention also comprises the steps of placing the gas in fluid communication with a venturi eductor disposed in a sealed container, introducing a sufficient flow of fluid to the venturi eductor to pull the gas into the venturi eductor and mix the gas with the fluid, exhausting the mixture of gas and fluid from the venturi eductor, separating the exhausted gas from the exhausted fluid, and exhausting the separated gas from the sealed container.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Figure 1:
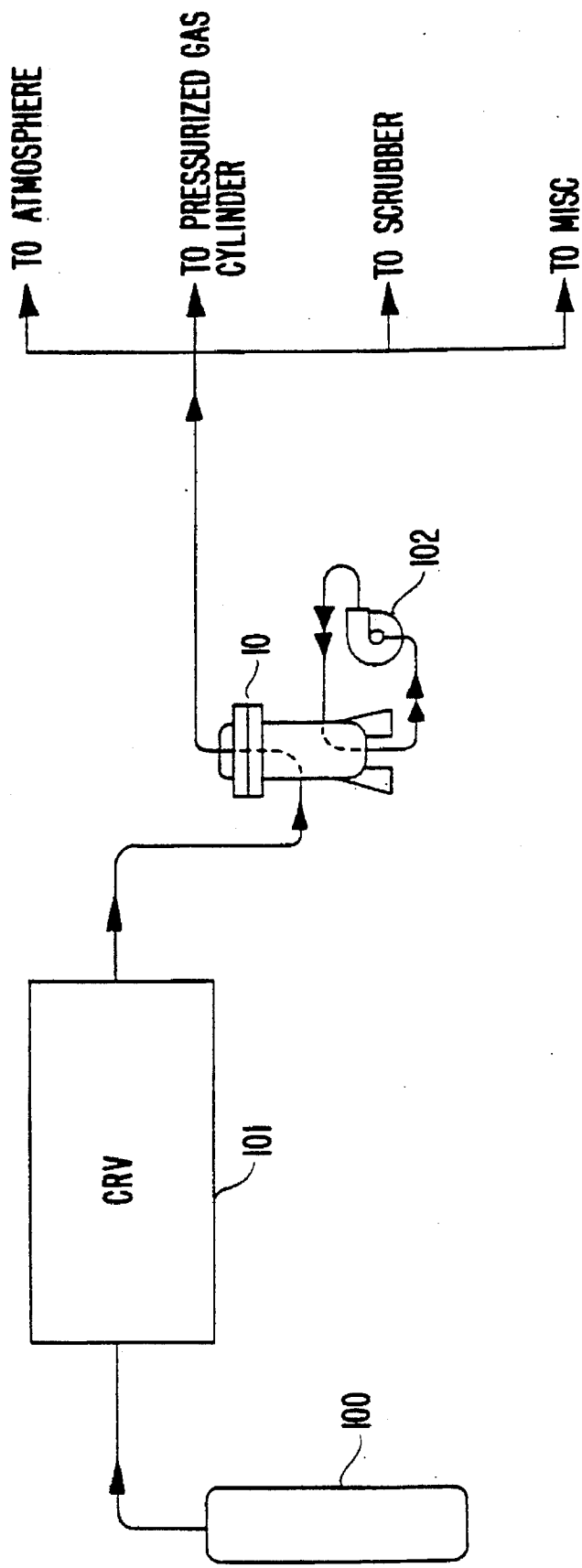
FIG. 1 is a schematic illustration of the gas recovery system of the present invention.
Figure 2:
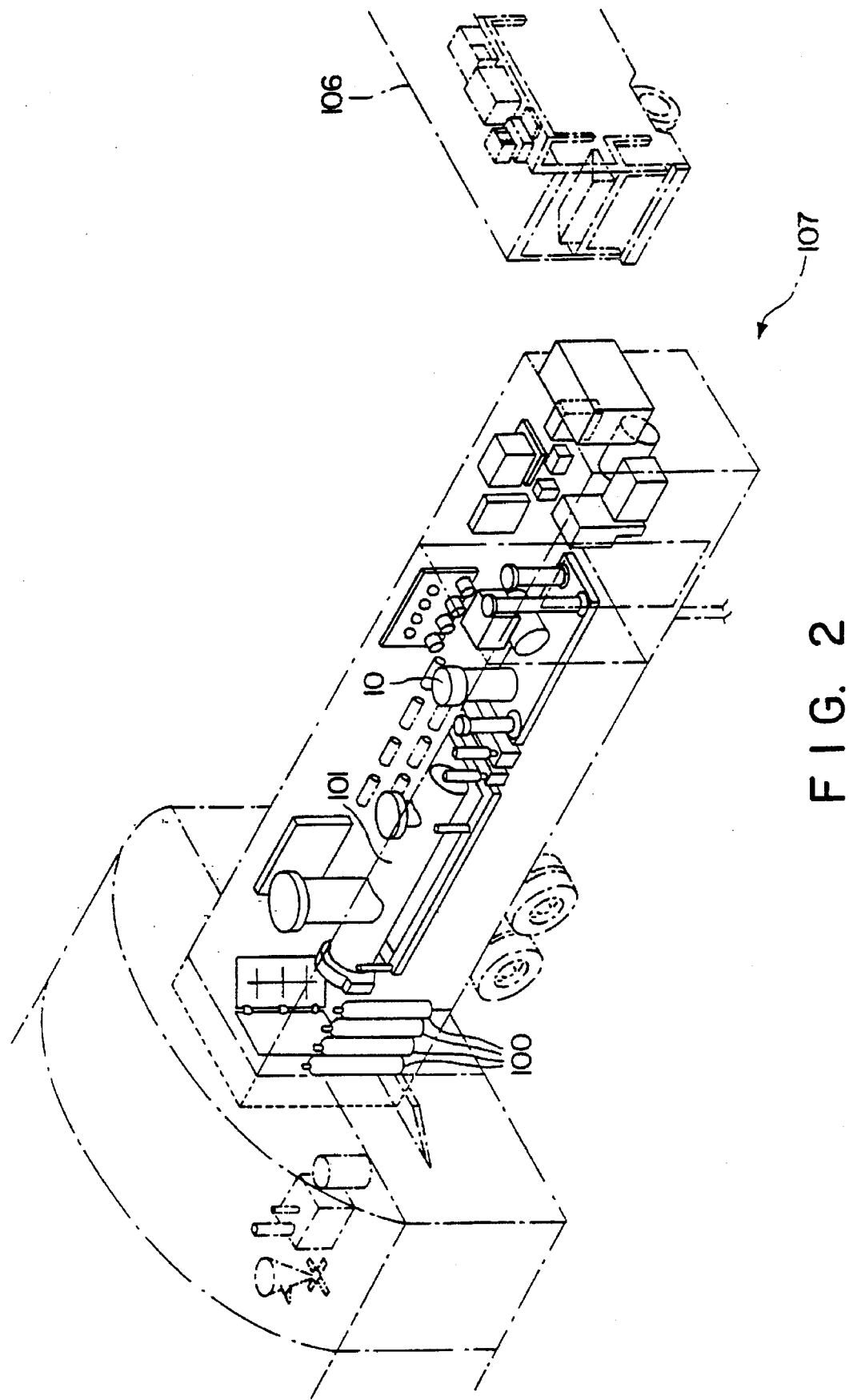
FIG. 2 is an isometric illustration of one possible embodiment of the system of the present invention, showing the placement of the components as they might appear in a mobile trailer, forming a mobile gas recovery unit.

Reference will now be made in detail to the present preferred embodiments of the invention, examples of which are illustrated in the accompanying drawings. Wherever possible, the same reference numbers will be used throughout the drawings to refer to the same or like parts.

The present invention is directed to a cylinder rupture vessel ("CRV") 101 into which a gas container, such as a pressurized gas cylinder 105, may be placed. After a pressurized gas cylinder 105 is introduced into the CRV, the CRV is sealed and air is purged from the interior of the CRV. An inert gas is then introduced into the vessel until the atmosphere inside the CRV is completely inert. Within the cylinder rupture vessel 101, a puncture spike 103 then operates to puncture a hole in the pressurized gas cylinder 105 to release the contents of the pressurized gas cylinder 105 into the CRV 101. A drill also can be used to provide this hole in the gas cylinder.

Once the contents of the gas cylinder 105 are released into the CRV, the released gas can be analyzed. The gases present in the CRV are then evacuated by a pump 10. The gas within the cylinder rupture vessel 101 can then be disposed of in one of any number of possible manners The gas may be vented into the atmosphere if it proves to be a harmless gas such as oxygen or nitrogen. The gas may be recontainerized if it proves to be harmful so that the gas may be disposed of in a proper manner. The gas may also be "scrubbed." "Scrubbing" is the process whereby a gas is chemically reacted with another substance to produce a more safe and more easily handled product.

It is preferred that the CRV 101 be connected to one or more pressurized gas cylinders 100 which contain an essentially chemically inert gas such as nitrogen. Thus, as the pump 10 draws the waste gas from the container rupture vessel 101 after the pressurized gas cylinder 105 has been punctured, the essentially inert gas is bled into the CRV 101 to purge the waste gas from the CRV 101 and ensure essentially complete removal of the waste gas from the CRV 101.

Figure 3:
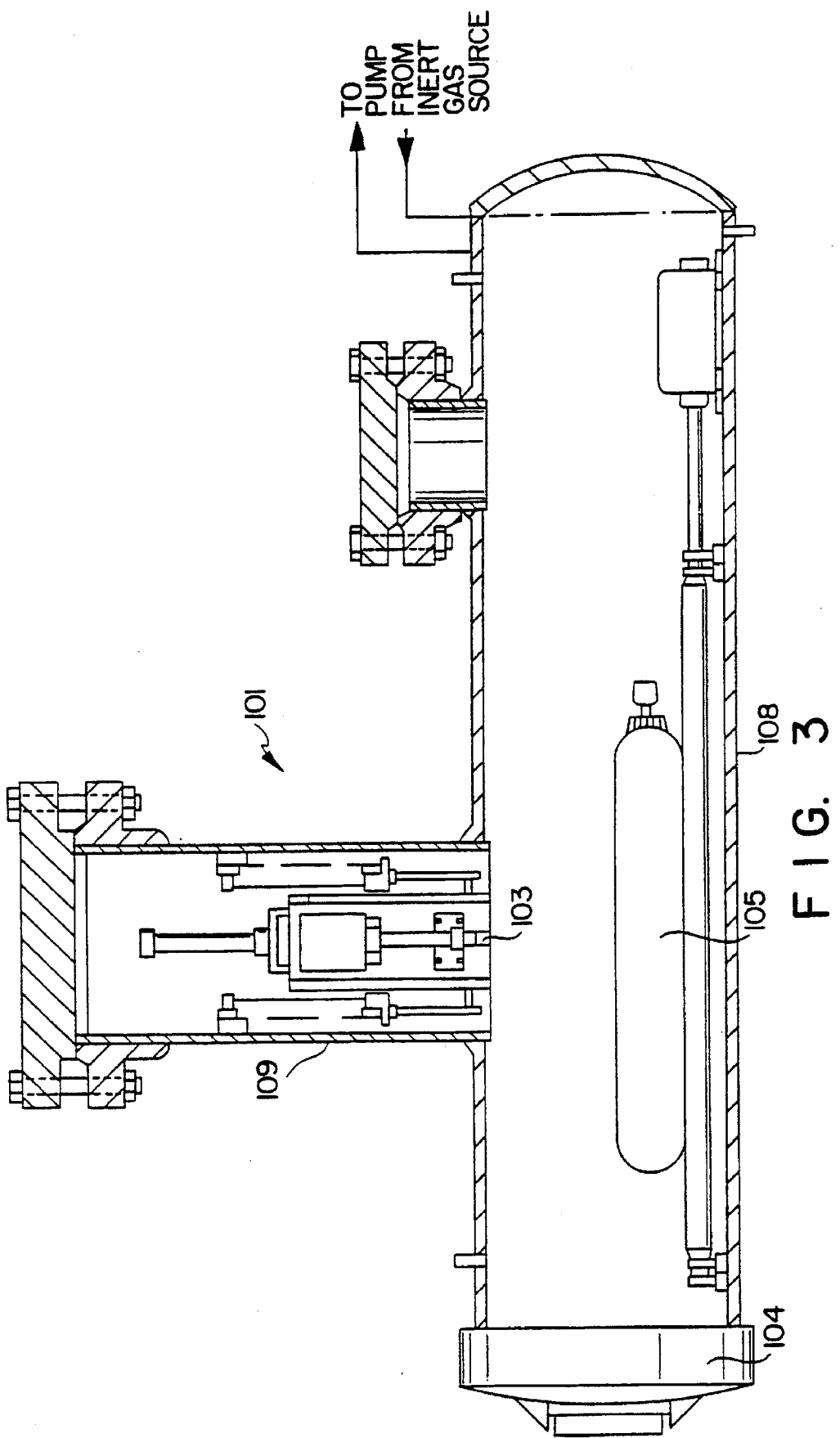
FIG. 3 is a cross-sectional illustration of the container rupture vessel component of the present invention.

The container rupture vessel 101 is composed of a CRV housing 108 having a CRV flange 104 at one end. The CRV 101 is generally depicted in FIG. 3. This figure is an adaptation of FIG. 16 of the '333 patent with the appropriate components renumbered for purposes of the present disclosure. The CRV flange 104 is a sealable door which allows access to the interior of the CRV housing 108. The CRV flange 104 may be opened so that a pressurized gas cylinder 105 may be placed into the CRV housing 108.

A puncture device housing 109 is connected to and incorporated with the CRV housing 108 to form the CRV 101. The puncture device housing 109 contains the working mechanism of the puncture device 103. The puncture device housing 109 also contains the puncture device 103. The puncture device 103 punctures a hole in the side of the waste gas cylinder 105 to allow the waste gas to fill the CRV 101. When actuated the puncture device 103 moves from the puncture device housing 109 into the CRV housing 108.

The CRV 101 is connected to an inert gas source 100. The inert gas source may be, for example, one or more pressurized gas cylinders filled with nitrogen. After the CRV 101 is closed and sealed, air is purged from the CRV and an inert gas is introduced. The cylinder 105 is then punctured. After the pressurized gas cylinder 105 has been punctured, the pump 10, which is connected to the CRV 101, creates a vaccum within the CRV. In ordinary circumstances, once a vaccum is created inside the CRV, inert gas is reintroduced. The waste gas from cylinder 105 and the inert gas are then drawn from the CRV 101. The inert gas from the inert gas source 100 dilutes the waste gas remaining in the CRV 101 and ensures essentially complete removal of waste gas from the CRV 101. Without the addition of the inert gas, the pump 10 would quickly establish an atmospheric equilibrium within the CRV 101 which would leave some of the waste gas within the CRV 101.

The pump 10 which is connected to the CRV 101 draws the waste gas from the CRV 101, pressurizes it, and discharges the gas. The gas may then be directed to any of a number of possible destinations. If the waste gas is innocuous such as nitrogen or oxygen, the waste gas can be vented into the atmosphere. If the waste gas can be "scrubbed", which means it can be chemically reacted with another substance to produce a more safe and easily handled end product, then the waste gas will be sent to a scrubber. If the waste gas proves to be toxic, corrosive or otherwise dangerous, the waste gas may be recontainerized in a new pressurized gas cylinder (not shown).

In the event that the waste gas is to be returned to a new pressurized gas cylinder, the pump 10 of the present invention, described in detail below, may be connected to a compressor (not shown) before the waste gas can be properly stored. A pump of the present invention having a single-stage venturi design may generate as much as 70 p.s.i.g. A two-stage venturi pump may generate as much as 200 p.s.i.g. However, the waste gas often is pressurized up to 2400 p.s.i.g. (a standard container pressure) to be recontainerized. The pump 10 of the present invention is incapable of producing so high an output pressure. Nevertheless, the pump 10 is essential to the recontainerization process, because the conventional compressors used in this field cannot efficiently operate at a pressure below 10 p.s.i.g. The pump 10, therefore, acts as a needed primer for the compressor which follows it.

Figure 4:
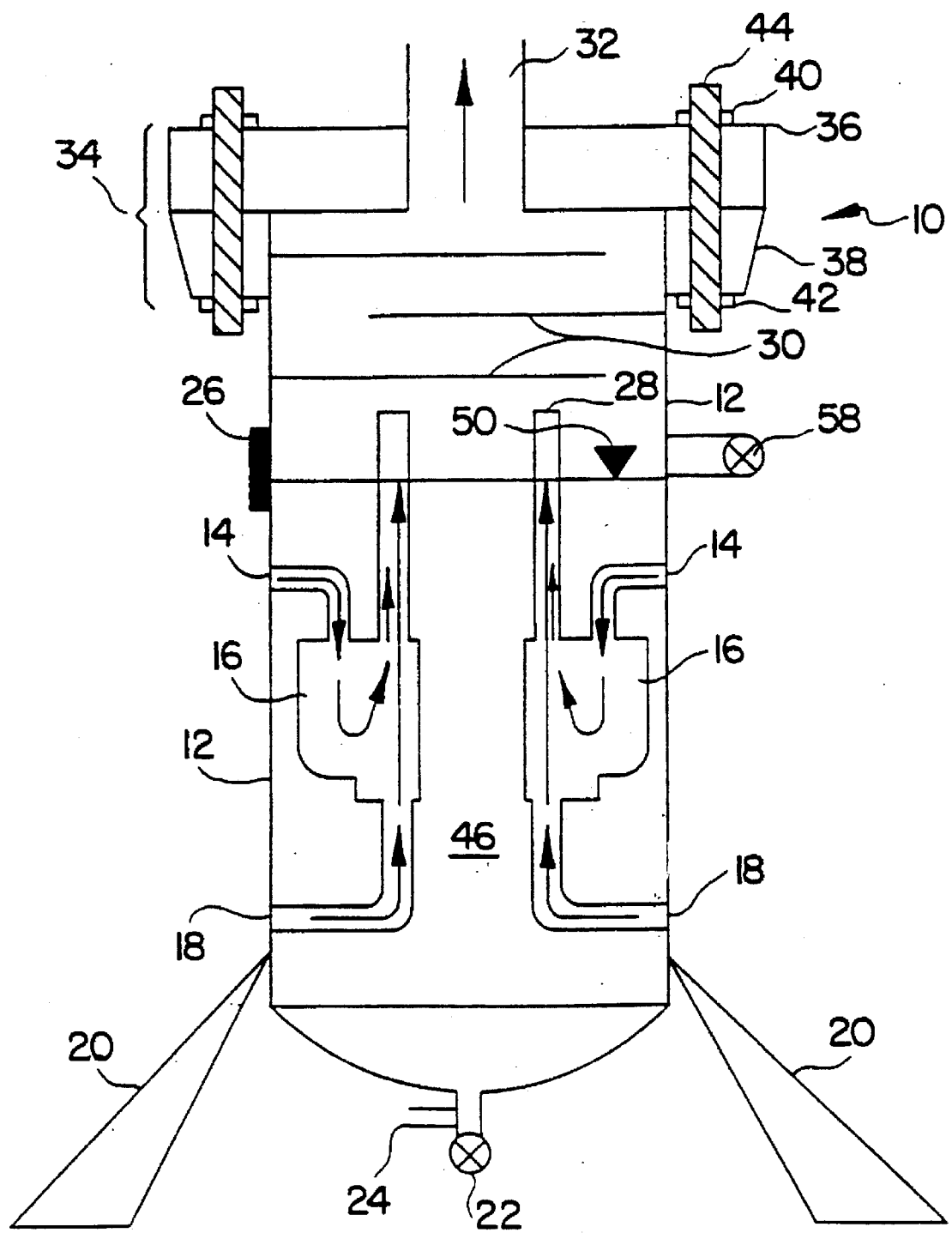
FIG. 4 is a cross-sectional illustration showing one possible embodiment of the pump of the present invention.
Figure 5:
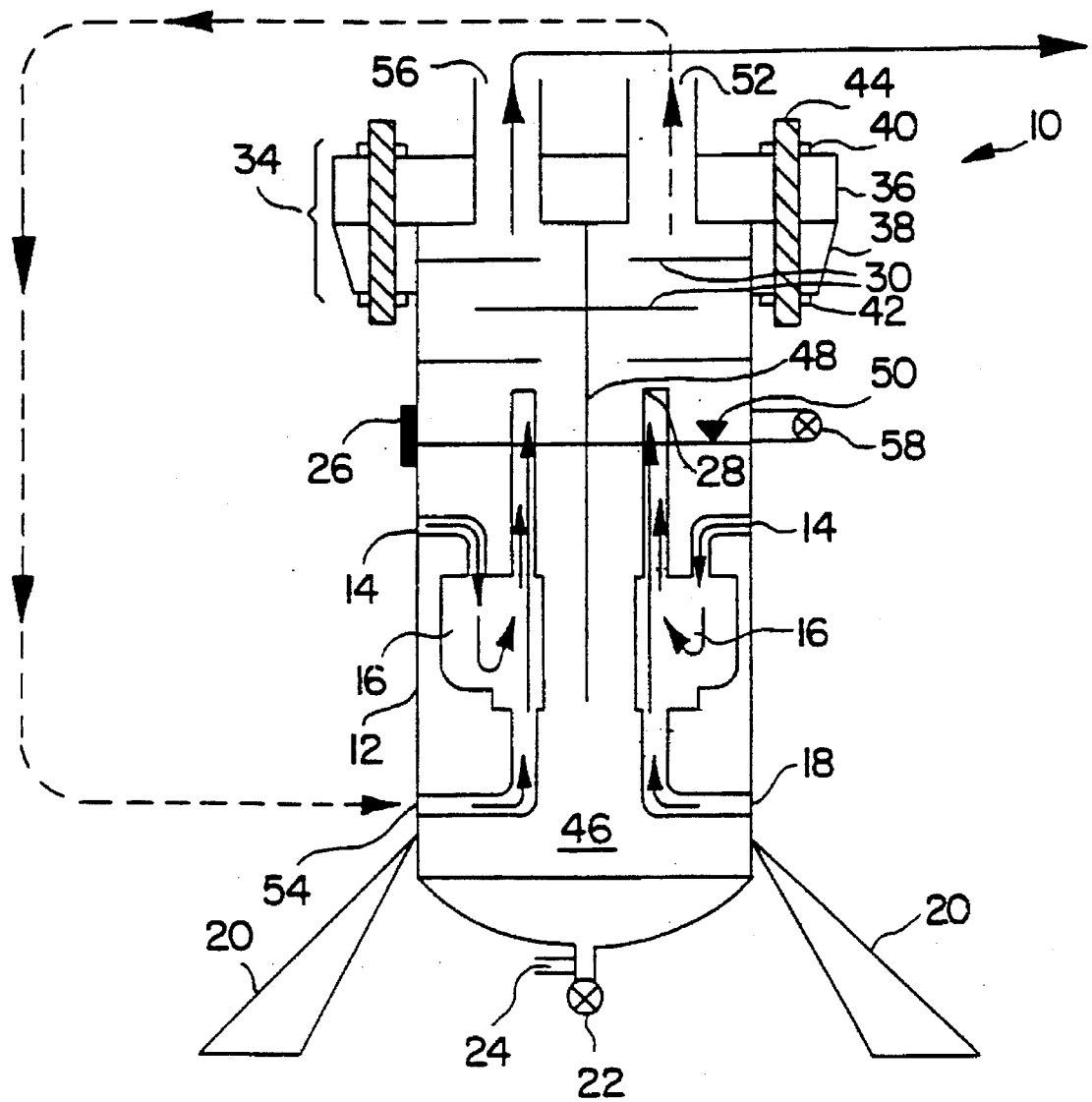
FIG. 5 is a cross-sectional illustration of an alternate embodiment of the pump of the present invention.

The pump 10 is a component of the system and is generally depicted in FIG. 1. Examples of two embodiments of the pump 10 of the present invention are shown in FIG. 4 and FIG. 5. The pump 10 includes a pressure vessel 12 having a sealable top 34. The sealable top 34 is composed of several subcomponents. The sealable top 34 has a cover plate 36 which can be removed from the flange 38. In the illustrated embodiment, the cover plate 36 is attached to the flange 38 by a series of top bolts 40, screws 44, and bottom bolts 42. As would be obvious to persons of ordinary skill in the art, a number of conventional means can be used to attach the cover plate 36 to the flange 38 on the pressure vessel 12 in a sealable manner.

The pressure vessel 12 and the cover plate 36 form an impermeable sealed pump housing having at least one gas inlet 18 and at least one gas outlet 32 for the gas to be pumped to its ultimate destination. In the two preferred embodiments shown in FIG. 4 and FIG. 5, the pump includes two gas inlets 18 and (18 and 54 in FIG. 5) which are communicated with venturi eductors 16. In addition, the pump housing 12, which is supported on supports 20 includes at least fluid inlet port 14 for accepting fluid 46. The pump housing 12 also includes at least one fluid outlet 24. In the two illustrated embodiments, there are two fluid inlet ports 14 per pump 10, each connected to one venturi eductor 16. The venturi eductors 16 will be described in greater detail below.

The bottom of the pressure vessel 12 contains a drain plug 22 through which the fluid 46 may be drained from the pump housing 12. A fluid outlet 24 is also attached to the bottom of the pressure vessel 12. As explained in greater detail below, the fluid 46 is hydraulically pumped from the fluid outlet 24 to the fluid inlet 14 by a hydraulic pump 102, such as a Hall 2½" Gear Hydraulic Pump.

The pressure vessel 12 also preferably contains a fluid drain port 58 which provides control over the fluid level within the pressure vessel 12. A liquid level sight glass 26 is also preferably provided on the side of the pressure vessel 12 to provide visual information regarding the fluid level 50.

The pressure vessel 12 is filled to the fluid level 50 with a fluid 46 that is essentially chemically inert or substantially chemically non-reactive. The fluid may be a substance such as Krytox® fluorinated lubricant made by the DuPont Company. Krytox® is a chemically non-reactive substance known as perfluoroalkylpolyether. Krytox® has the following chemical structure:

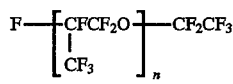

where n=10 to 60.

The fluid 46 is supplied to the venturi eductors 16 through the fluid inlets 14 which extend through the side of the pressure vessel 12 and are connected to the venturi eductors 16. The venturi eductors 16 include at least one fluid inlet 14, at least one gas inlet 18, a mixing chamber in which the gas and fluid 46 are combined, and a venturi outlet port 28 through which the mixture of gas and fluid 46 are discharged from the venturi eductor 16.

Venturi eductors 16 are generally known and are commercially available. For example, venturi eductors 16 manufactured by Teel (company name) and identified as Model 2P430 have been found to be acceptable for use in the present invention. The fluid conduits from the exterior of the pump housing 12 to the venturi eductors 16 provide a fluid-tight channel to assure efficient operation of the pump 10.

In operation, a flow is introduced into the venturi eductor 16 creating a vacuum in the mixing chamber, and the gas is drawn from the exterior of the pump 10 through the gas inlet 18 to the mixing chamber in the venturi eductor 16. The fluid inlet, the gas inlet 18, and the venturi eductor 16 are all located below the fluid level 50. The venturi outlet 28 extends from the mixing chamber of the venturi eductor to a point above the fluid level 50 and is therefore only partially submerged in the fluid 46.

Because of this construction, the pump 10 operates with a minimum of mechanical parts. The inert fluid 46 is drawn from the bottom of the pressure vessel 12 through the fluid outlet port 24 to a pump 102. The fluid 46 is then returned from the pump 102 to the pressure vessel 12 through the fluid inlet 14.

The operation of the pump 10 is dependent upon the velocity of the fluid 46 through the venturi eductor 16. The movement of the fluid through the venturi eductor 16 generates a suction which draws the gas through the gas inlet 18. The gas and fluid 46 form a mixture or solution within the mixing chamber and that mixture is forcefully discharged from the venturi outlet 28.

The present invention includes a means for separating the gas from the fluid 46. In the embodiments shown, separation of gas from fluid 46 is achieved by means of a series of baffle plates 30 formed above the venturi outlets 28. This separation is possible, because the fluid 46 is essentially chemically non-reactive and it does not combine with the gas. Therefore, the gas and fluid 46 merely form a solution. When the gas/fluid solution is ejected from the venturi outlet 28, the solution strikes an exhaust baffle 30 positioned between the venturi outlet 28 and the gas outlet 38. The exhaust baffle 30 presents a convoluted pathway to the gas/fluid solution. The numerous convolutions of the baffle 30 condense the fluid 46 and separate the fluid 46 from the gas before the fluid 46 reaches the gas outlet 32. This prevents the fluid 46 from exiting the pressure vessel 12 with the gas. The baffles 30 ensure complete separation of gas from the fluid 46. The gas is removed from the pressure vessel 12 through a gas outlet 32 in the cover plate 36. The fluid 46 returns to the main reservoir. Since the fluid 46 does not exit the pressure vessel 12, it may be continuously recycled.

While in the embodiments illustrated, baffle plates 30 are used to assist in the separation of the gas from the fluid 46 and prevent or minimize the loss of fluid 46 through the gas outlet 32. It will be apparent, therefore, to one skilled in the art that other systems for separating the gas from the fluid 46 can be used to accomplish the same result. For example, a filter may be used to separate fluid 46 from gas. The filter may take the form of a steel wool pad or the like.

It is preferred that a hydraulic pump 102 provide the motive force to the pump 10 of the present invention. The hydraulic pump 102 draws the inert fluid 46 from the fluid reservoir in the pressure vessel 12 through an outlet 24 at the bottom of the pressure vessel 12. The fluid is then returned to the pressure vessel 12 via the fluid inlets 14 which supply the venturi eductors 16. Due to the non-reactive characteristic of the inert fluid 46, the gas is not transported in solution to the hydraulic pump 102, and the hydraulic pump 102 is spared wear, tear, and failure from exposure to potentially hostile chemical conditions.

The advantage of this system is that the fluid 46 remains essentially gas free. Therefore, the gas does not react with the moving parts of the high pressure pump, and the pump is spared from excessive wear. This feature is especially useful where the gas is corrosive.

The present invention avoids the possible shortcomings of a typical vacuum pump, because the gas does not come in contact with the moving parts of the hydraulic pump 102. The gas remains contained within the pressure vessel 12. Therefore, regardless of the type of gas removed from the deteriorated compressed gas cylinder 105, there is a high safety margin for transferring the gas to a new storage container.

The pressure vessel 12 may contain one or more venturi eductors 16. For example, the venturi eductors 16 may be arranged in parallel, as shown in FIG. 4. If arranged in parallel, both eductors 16 work together to produce a certain pressure of the gas which exits through the gas outlet 32. The greater the number of venturi eductors 16 within the pressure vessel 12, the larger the volume of gas that may be processed in any given time interval.

Alternatively, the venturi vacuum pump 10 may be designed so that several venturi eductors 16 work in series as depicted in FIG. 5. The series arrangement differs from the parallel configuration in that the series model has a dividing baffle 48 positioned between the venturi outlets 28 and extending below the fluid level 50 of the fluid 46. Also, the gas from the first stage gas outlet 52 is channelled into the second stage gas inlet 54 which is structurally equivalent to the first gas inlet 18. The gas is processed and exits from the second stage gas outlet 56 at a higher pressure than the pressure of the first stage gas outlet 52. The series arrangement provides a means by which the pressure of the exigent gas is greater than the previous example where the venturi eductors 16 are operating in parallel.

Since the fluid 46 is essentially inert, it may be used to transport any number of gases that may be hazardous, toxic, corrosive, flammable and/or poisonous.

As indicated by FIG. 4 and FIG. 5, the pump 10 may be designed so that more than one venturi eductor 16 can be incorporated into the pump unit 10. It is also possible to connect the venturi vacuum pump 10 in series or parallel with other venturi pumps 10 to increase the output and/or decrease the pressure of the vacuum generated. Connecting several pumps 10 in parallel or in series provides the same advantages as providing multiple venturi eductors 16 in the pressure vessel 12 in series or in parallel. Namely, the series approach will allow for a greater pressure of the gas exigent from the gas outlet 38. The connection of several pumps 10 in parallel will allow for processing of a greater volume of gas during a specific time interval.

It will be apparent to those skilled in the art that various modifications and variations can be made in a system for removal of gases from a container of the present invention and in construction of this system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for removing gas from a gas container comprising:

a sealable, impermeable rupture vessel having an interior enclosed on all sides and a sealable door for allowing access to the interior for placement therein of the gas container;

an access mechanism within the rupture vessel for accessing the contents of the gas container and releasing the potentially hazardous and unknown gas from the gas container into the rupture vessel;

a first pump, in fluid communication with said rupture vessel, for drawing gas from the rupture vessel; and a second pump for providing a motive force to said first pump, whereby the gas is prevented from communicating with any moving, mechanical parts in at least the second pump; and wherein a flow of substantially chemically non-reactive liquid generated by the second pump draws the gas through the first pump.

2. The system of claim 1, further comprising means for mixing the gas from the rupture vessel with the flow of inert fluid to create a mixture of gas and fluid and means for separating the gas from the mixture of gas and fluid.

3. The system of claim 1 wherein said second pump is a hydraulic pump.

4. A system for removing gas from a gas container comprising:

a vessel including means for allowing access to the interior of said vessel for placement therein of a gas container;

means for accessing said gas container thereby causing potentially hazardous and unknown gas to release from the gas container into said vessel; and a trust pump, in fluid communication with said vessel for drawing the potentially hazardous and unknown gas from said vessel, said first pump having a pumping fluid that is substantially chemically non-reactive fluid; and a second pump for providing a motive force to said first pump;

whereby the gas does not communicate with moving, mechanical parts in the second pump.

5. The system of claim 4 wherein said first pump comprises a venturi pump.

6. The system of claim 4 wherein a flow of said substantially chemically non-reactive liquid generated by the second pump draws the gas through the first pump.

7. The system of claim 4 wherein said second pump is a hydraulic pump.

* * * * *